United States Patent
Kobayashi et al.

(10) Patent No.: US 6,777,486 B2
(45) Date of Patent: Aug. 17, 2004

(54) VIBRATION DAMPING SILICONE COMPOSITION

(75) Inventors: Hideki Kobayashi, Chiba Prefecture (JP); Masayuki Hayashi, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 464 days.

(21) Appl. No.: 09/891,899

(22) Filed: Jun. 26, 2001

(65) Prior Publication Data

US 2002/0042456 A1 Apr. 11, 2002

(30) Foreign Application Priority Data

Aug. 31, 2000 (JP) ........................................ 2000-262107

(51) Int. Cl.$^7$ ............................ C08L 83/00; C08K 3/00
(52) U.S. Cl. ................. 524/588; 524/284; 524/300; 524/322; 428/402.2; 428/402.21; 428/402.22; 428/403
(58) Field of Search ................................ 524/588, 425, 524/447, 451, 493; 428/402.21, 402.22, 403, 404; 523/218

(56) References Cited

U.S. PATENT DOCUMENTS

| 3,894,169 | A | | 7/1975 | Miller ........................ 428/425 |
|---|---|---|---|---|
| 4,374,950 | A | | 2/1983 | Shimizu ...................... 524/765 |
| 4,416,790 | A | | 11/1983 | Schurmann et al. ........... 252/62 |
| 4,514,529 | A | | 4/1985 | Beers et al. ................. 523/200 |
| 4,678,828 | A | | 7/1987 | Nakamura et al. ........... 524/265 |
| 5,342,721 | A | | 8/1994 | Akamatsu .................... 430/108 |
| 5,550,185 | A | | 8/1996 | Inoue et al. ................. 524/847 |
| 5,661,203 | A | * | 8/1997 | Akamatsu et al. ........... 524/269 |
| 5,745,472 | A | | 4/1998 | Son ............................ 369/263 |
| 5,840,220 | A | | 11/1998 | Akamatsu et al. ............ 264/15 |
| 5,856,396 | A | | 1/1999 | Vipperman ................... 524/425 |
| 6,274,648 | B1 | * | 8/2001 | Meguriya et al. ............ 523/218 |
| 6,347,411 | B1 | | 2/2002 | Darling ......................... 2/272 |
| 6,498,211 | B2 | | 12/2002 | Kobayashi et al. .......... 524/588 |
| 6,602,945 | B2 | | 8/2003 | Kobayashi et al. .......... 524/492 |
| 6,605,231 | B2 | | 8/2003 | Kobayashi et al. ........... 252/62 |
| 6,627,705 | B2 | | 9/2003 | Kobayashi et al. .......... 525/477 |
| 2003/0191216 | A1 | | 10/2003 | Tateishi et al. .............. 524/261 |

FOREIGN PATENT DOCUMENTS

| EP | 0 635 549 B1 | 7/1994 | ........... C08L/83/04 |
|---|---|---|---|
| EP | 0651020 A2 | 5/1995 | ........... C08L/83/04 |
| EP | 0 774 488 A1 | 5/1997 | ........... C08L/23/02 |
| EP | 0 990 816 A1 | 9/1999 | ............ F16F/9/00 |
| JP | 62-113932 | 5/1987 | ........... F16F/13/00 |
| JP | 63-308241 | 12/1988 | ........... F16F/13/00 |
| JP | 63-308242 | 12/1988 | ........... F16F/13/00 |
| JP | 9-263525 | 10/1997 | ............ A61K/7/46 |
| JP | 10-251517 | 9/1998 | ........... C08L/83/04 |
| JP | 10-281202 | 10/1998 | ............ F16F/9/30 |
| JP | 11-182624 | 7/1999 | ........... F16F/15/04 |
| JP | 2000-80277 | 3/2000 | ........... C08L/83/04 |
| WO | WO 97/16480 | 5/1997 | ............ C08K/3/26 |

OTHER PUBLICATIONS

Tateishi et al., Vibration Damping Composition, Sep. 27, 1999, US application No. 09/406,583.

* cited by examiner

*Primary Examiner*—Margaret G. Moore
*Assistant Examiner*—Marc S. Zimmer
(74) *Attorney, Agent, or Firm*—Sharon K. Severance

(57) ABSTRACT

A vibration damping silicone composition with excellent long term storage stability and vibration damping ability contains as components (A) a silicone oil, (B) hollow particles of an organic resin having an inorganic material powder supported on its surfaces, and (C) a solid inorganic material powder.

10 Claims, No Drawings

VIBRATION DAMPING SILICONE COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is related to a vibration damping silicone composition with excellent vibration damping and storage stability.

BACKGROUND OF THE INVENTION

The use of silicone compositions containing silicone oils and fillers as vibration damping materials is known because silicone oils have low temperature dependence of viscosity, and high compressibility. Such materials have been used as vibration damping elements in devices that read optical signals such as compact disks and laser disk units, in devices that read magnetic signals such as magnetic disks and magneto-optical disk units, and in precision measuring instruments.

To improve vibration damping, and to reduce the amounts of such silicone compositions, U.S. Pat. Nos. 5,661,203 (Aug. 26, 1997) and 5,840,220 (Nov. 24, 1998), teach the use of a composition in which hollow particles of an organic thermoplastic resin are added to a silicone oil. However, the silicone compositions incorporating the hollow particles of organic thermoplastic resin have the disadvantage that over time, the silicone oil and the hollow particles undergo phase separation, and the hollow particles agglomerate at the surface of the composition.

BRIEF SUMMARY OF THE INVENTION

Therefore, it is an object of the invention to provide a vibration damping silicone composition offering excellent storage stability for extended periods of time.

These and other features of the invention will become apparent from a consideration of the detailed description.

BRIEF DESCRIPTION OF THE SEVERAL VIEWS OF THE DRAWINGS

Not applicable.

DETAILED DESCRIPTION OF THE INVENTION

The present invention relates to a vibration damping silicone composition containing:

(A) 100 parts by weight of a silicone oil, (B) 0.1–50 parts by weight of hollow particles of an organic resin having an inorganic material powder supported on surfaces of the hollow particles of organic resin, and (C) 1–300 parts by weight of an inorganic material powder.

Silicone oil component (A) functions as a medium for dispersing the fine particulate solids of components (B) and (C). (A) should be an organopolysiloxane that is a liquid at room temperature. Groups which can be bonded to silicon atom in such organopolysiloxanes include alkyl groups such as methyl, ethyl, and propyl; alkenyl groups such as vinyl, allyl, and butenyl; aryl groups such as phenyl and tolyl; and halogenated alkyl groups such as 3,3,3-trifluoropropyl. Some groups can include hydroxy or alkoxy groups such as methoxy and ethoxy. Alkyl groups, and methyl in particular, are most preferred since such compositions possess negligible temperature dependence of viscosity, and good storage stability.

The organopolysiloxane molecular structure can be linear, linear with some branching, branched, or cyclic. A linear structure is preferred. The kinematic viscosity at 25° C. of component (A) should be 100–1,000,000 mm$^2$/s, preferably 500–500,000 mm$^2$/s. This is because when the viscosity is below 100 mm$^2$/s, components (B) and (C) tend not to remain in a uniformly dispersed state; whereas above 1,000,000 mm$^2$/s, process ability is impaired, and it becomes increasingly difficult to evenly disperse components (B) and (C) in component (A). Some silicone oils suitable as component (A) are trimethylsiloxy end capped dimethylpolysiloxanes, dimethylvinylsiloxy end capped dimethylpolysiloxanes, silanol end capped dimethylpolysiloxanes, and trimethylsiloxy end capped dimethylsiloxane/methylphenylsiloxane copolymers.

To improve the long term storage stability and the reliability of component (A), it should contain no more than 1,000 ppm of organopolysiloxane oligomers with less than about 20 silicon atoms. Silicone oils with reduced oligomer content can be derived from silicone oil that has been stripped subsequent to their ordinary equilibrium polymerization. Prior to stripping, the oligomer content is typically 10,000–40,000 ppm, but it can be reduced by subjecting the oil to processes to further reduce its oligomer content. Some examples of processes for removal of oligomers include the use of a thin film evaporator operating under conditions of 270–350° C. and 0.1–15 mm Hg; extraction with organic solvents including alcohols such as methanol, ethanol, propanol, or butanol, and ketones such as acetone and methyl ethyl ketone; and re-precipitation.

The component (B) organic resin hollow particles consist of hollow particles of an organic resin having an inorganic material powder supported on their surface. While the particular type of organic resin comprising the particle wall of the support is not critical, a thermoplastic resin is preferred. Some examples of suitable resins include vinyl resins such as styrene resins, vinyl acetate resins, vinyl chloride resins, vinylidene chloride resins, methyl methacrylate resins, acrylonitrile resins, butadiene resins, chloroprene resins, vinylidene chloride/acrylonitrile copolymer resins, vinyl chloride/acrylonitrile copolymer resins, vinyl acetate/butadiene copolymer resins, styrene/butadiene copolymer resins; olefin resins such as polyethylene resins, polypropylene resins, ethylene/propylene copolymer resins, ethylene/propylene/styrene copolymer resins; polyamide resins such as 6-nylon, and 6,6-nylon; and polyester resins such as polyethylene terephthalate and polybutylene terephthalate. The inorganic material powder supported on the organic resin surface is also not critical. Some suitable powder include calcium carbonate, talc, titanium oxide, and silica. The amount of inorganic material powder being supported on the hollow particles of organic resin should be at least 70 percent by weight of the component (B).

The internal phase of the hollow structure of component (B) is not critical, and it can include blowing agents used to expand component (B) or residues thereof, air, nitrogen gas, helium gas, argon gas, or neon gas. The morphology of component (B) includes spherical, disk, or gourd like shapes. Spherical morphology is most preferred. The particle size should be 5–500 µm, especially 10–300 µm. The proportion of component (B) can be 0.1–50 parts by weight, preferably 0.5–30 parts by weight, per 100 parts by weight of component (A). This is because the vibration damping ability of the composition decreases when the proportion of component (B) is less than 0.1 parts by weight, whereas processing becomes more difficult using proportions exceeding 50 parts by weight.

The combined use of an inorganic material powder component (C) with component (B) functions to further improve storage stability and vibration damping of the silicone composition. Some examples of inorganic material powders include finely divided silica, finely divided glass, clay, bentonite, diatomaceous earth, powdered quartz, calcium carbonate powder, talc, titanium oxide powder, tin oxide powder, aluminum oxide powder, iron oxide powder, and metal powders. The inorganic material powder can be treated with a fatty acid or a fatty acid derivative such as capric acid, lauric acid, myristic acid, palmitic acid, stearic acid, oleic acid, linoleic acid, cerotic acid, behenic acid, elaidic acid, and arachidic acid. Fatty acid derivatives include the alkali metal salts, alkaline earth metal salts, and metal salts of such fatty acids.

Calcium carbonate powders can include heavy calcium carbonate powder and light calcium carbonate powder. Heavy calcium carbonate powder, known as powdered calcium carbonate, is produced by the mechanical comminution and classification of white limestone. Heavy calcium carbonate powders are available commercially under names such as WHITON P-305 from Toyo Fine Chemicals and NANOX 30 from Maruo Calcium. Heavy calcium carbonate powder with its surface treated with a fatty acid or fatty acid derivative has exceptional dispersion stability in component (A). Light calcium carbonate powder, known as precipitated calcium carbonate, can be produced by dewatering and drying a light calcium carbonate slurry, prepared by reacting fine limestone with $CO_2$. Light calcium carbonate powder with its surface treated with a fatty acid or fatty acid derivative has exceptional dispersion stability in component (A). Light calcium carbonate powders are available commercially under names such as HAKUENKA CC from Shiraishi Calcium and CALFINE 200 from Maruo Calcium.

Component (C) should have a mean particle size of 0.01–300 µm, preferably 0.01–100 µm. Its morphology can be spherical, flat, or amorphous. Component (C) should be included in amounts of 1–300 parts by weight, preferably 5–100 parts by weight, per 100 parts by weight of component (A). The vibration damping ability of the composition decreases when the proportion of component (C) is less than 1 part by weight, whereas processing becomes more difficult with proportions exceeding about 300 parts by weight.

Component (B) should have a larger mean particle size than component (C). Thus, it is preferred that the mean particle size of component (B) be at least 10 µm greater, preferably at least 15 µm greater, than the mean particle size of component (C). Some examples of suitable combinations of components (B) and (C) include the combination of component (B) with a mean particle size of 20 µm and component (C) with a mean particle size of 1 µm; or the combination of component (B) with a mean particle size of 100 µm and component (C) with a mean particle size of 4 µm.

In addition to components (A) to (C), the silicone composition can include component (D) which is a fatty acid or fatty acid derivative. Component (D) functions to improve the dispersion and the storage stability of the composition. Some examples of component (D) are fatty acids such as capric acid, lauric acid, myristic acid, palmitic acid, stearic acid, oleic acid, linoleic acid, cerotic acid, behenic acid, elaidic acid, and arachidic acid, as well as their alkali metal salts, alkaline earth metal salts, and metal salts. Representative fatty acid derivatives include the alkali metal salts, alkaline earth metal salts, and metal salts of such fatty acids. $C_{6-31}$ fatty acids and their derivatives are preferred. Component (D) can be included in amounts of 0.1–20 parts by weight, preferably 0.1–10 parts by weight, per 100 parts by weight of component (A). The silicone composition can include various other optional components including antioxidants, corrosion inhibitors, flame retardants, pigments, and dyes.

The silicone composition of the present invention can be prepared by homogenizing components (A) to (C) or (A) to (D). Mixing means which can be used include compounding devices such as ball mills, vibration mills, kneader mixers, screw extruders, paddle mixers, ribbon mixers, Banbury mixers, Ross mixers, Henschel mixers, flow jet mixers, Hobart mixers, and roll mixers. The material can be heated during its mixing to temperatures of 30–200° C.

Silicone compositions according to this invention possess excellent vibration damping, are light in weight despite their content of fillers, and a long term storage stability. They can be sealed in elastomeric packages such as rubber bags or rubber tubes when used as buffer elements in compact disk players, compact disk changers, mini-disk players, car navigation devices, and in other electrical and electronic devices exposed to significant changes in temperature.

EXAMPLES

The following examples illustrate the invention in more detail. The kinematic viscosity measurements in the Examples were made at 25° C. The vibration damping ability of the silicone compositions was determined by measuring their loss tangent (tan δ) at 25° C. and at 70° C. Their tan δ measurements were made by the plate method using a DYNAMIC ANALYZER Model RDA 7000 manufactured by Rheometric Scientific. The measurement conditions included the use of a 25 mm plate diameter, a 10 Hz frequency, 20 percent strain, and a one mm sample thickness.

Example 1

To a mixer was charged (i) 100 g of a dimethylpolysiloxane end capped at both of its terminals with trimethylsiloxy groups, and having a kinematic viscosity of 10,000 $mm^2/s$; (ii) 9 g of hollow microspheres of polyacrylonitrile resin having calcium carbonate powder supported on its surface, consisting in particular of MICROSPHERE MFL-100 CA from Matsumoto Yushi with a particle size of 100 µm and containing calcium carbonate powder in the amount of about 90 weight percent; (iii) 18 g of a heavy calcium carbonate powder with a mean particle size of 20 µm; and (iv) 64 g of a light calcium carbonate powder whose surface had been treated with stearic acid, having a BET specific surface of 18 $m^2/g$ and a mean particle size of 0.12 µm calculated from the BET specific surface. This material was kneaded for one hour at 150 rpm while scraping it from the wall of the mixer every 30 minutes, to produce a silicone composition according to the invention. The vibration damping ability of the silicone composition was measured and the results are shown in Table 1. The silicone composition was also stored in a glass vial for one week, after which the appearance of the surface and bottom portions of the composition were visually inspected. Substantially no difference was observed between the surface and bottom portions, demonstrating that it possessed good storage stability. After the elapse of one week, the vibration damping ability of the composition did not change.

Example 2

To a mixer was charged (i) 100 g of a dimethylpolysiloxane end capped at both of its terminals with trimethylsiloxy groups, and having a kinematic viscosity of 10,000 mm$^2$/s; (ii) 5 g of hollow microspheres of polyacrylonitrile resin having calcium carbonate powder supported on its surface, consisting in particular of MICROSPHERE MFL-100 CA from Matsumoto Yushi with a particle size of 100 μm and containing calcium carbonate powder in the amount of about 90 weight percent; and (iii) 91 g of a light calcium carbonate powder whose surface had been treated with stearic acid, having a BET specific surface of 18 m$^2$/g and a mean particle size of 0.12 μm calculated from the BET specific surface. This material was kneaded for one hour at 150 rpm while scraping it from the wall of the mixer every 30 minutes, to produce a silicone composition according to the invention. The vibration damping ability of the silicone composition was measured and the results are shown in Table 1. The silicone composition was also stored in a glass vial for one week, after which the appearance of the surface and bottom portions of the composition were visually inspected. Substantially no difference was observed between the surface and bottom portions, demonstrating that it possessed good storage stability.

Example 3

To a mixer was charged (i) 100 g of a dimethylpolysiloxane end capped at both of its terminals with trimethylsiloxy groups, and having a kinematic viscosity of 10,000 mm$^2$/s; (ii) 14 g of hollow microspheres of polyacrylonitrile resin having calcium carbonate powder supported on its surface, consisting in particular of MICROSPHERE MFL-100 CA from Matsumoto Yushi with a particle size of 100 μm and containing calcium carbonate powder in the amount of about 90 weight percent; (iii) 28 g of a heavy calcium carbonate powder with a mean particle size of 20 μm; (iv) 21 g of a light calcium carbonate powder whose surface had been treated with stearic acid, having a BET specific surface of 18 m$^2$/g and a mean particle size of 0.12 μm calculated from the BET specific surface; and (v) 2 g of zinc stearate. This material was kneaded for one hour at 150 rpm while scraping it from the wall of the mixer every 30 minutes, to produce a silicone composition according to the invention. The vibration damping ability of the silicone composition was measured and the results are shown in Table 1. The silicone composition was also stored in a glass vial for one week, after which the appearance of the surface and bottom portions of the composition were visually inspected. Substantially no difference was observed between the surface and bottom portions, demonstrating that it possessed good storage stability.

Example 4

To a mixer was charged (i) 100 g of a dimethylpolysiloxane end capped at both of its terminals with trimethylsiloxy groups, and having a kinematic viscosity of 7,000 mm$^2$/s; (ii) 40 g of hollow microspheres of polyacrylonitrile resin having talc powder supported on its surface, consisting in particular of MICROSPHERE MFL-80 GTA from Matsumoto Yushi with a particle size of 20 μm and containing talc powder in the amount of about 90 weight percent; (iii) 20 g of talc powder with a mean particle size of 2 μm; (iv) 21 g of a light calcium carbonate powder whose surface had been treated with stearic acid, having a BET specific surface of 18 m$^2$/g and a mean particle size of 0.12 μm calculated from the BET specific surface; and (v) 5 g of zinc stearate. This material was kneaded for one hour at 150 rpm while scraping it from the wall of the mixer every 30 minutes, to produce a silicone composition according to the invention. The vibration damping ability of the silicone composition was measured and the results are shown in Table 1. The silicone composition was also stored in a glass vial for one week, after which the appearance of the surface and bottom portions of the composition were visually inspected. Substantially no difference was observed between the surface and bottom portions, demonstrating that it possessed good storage stability.

Example 5

To a mixer was charged (i) 100 g of a dimethylpolysiloxane end capped at both of its terminals with trimethylsiloxy groups, having a kinematic viscosity of 10,000 mm$^2$/s, and containing oligomers of less than 20 silicon atoms at less than about 400 ppm as determined by gas chromatography; (ii) 9 g of hollow microspheres of polyacrylonitrile resin having calcium carbonate powder supported on its surface, consisting in particular of MICROSPHERE MFL-100 CA from Matsumoto Yushi with a particle size of 100 μm and containing calcium carbonate powder in the amount of about 90 weight percent; (iii) 18 g of a heavy calcium carbonate powder with a mean particle size of 20 μm; and (iv) 64 g of a light calcium carbonate powder whose surface had been treated with stearic acid, having a BET specific surface of 18 m$^2$/g and a mean particle size of 0.12 μm calculated from the BET specific surface. This material was kneaded for one hour at 150 rpm while scraping it from the wall of the mixer every 30 minutes, to produce a silicone composition according to the invention. The vibration damping ability of the silicone composition was measured and the results are shown in Table 1. The silicone composition was also stored in a glass vial for one week, after which the appearance of the surface and bottom portions of the composition were visually inspected. Substantially no difference was observed between the surface and bottom portions, demonstrating that it possessed good storage stability. After the elapse of one week, the vibration damping ability of the composition did not change.

Comparison Example 1

A silicone composition was prepared as in Example 2 except that the light calcium carbonate powder was omitted. The vibration damping ability of the silicone composition was measured and the results are shown in Table 1. It was stored in a glass vial for one week, after which time the appearance of the surface and bottom portions of the composition were visually inspected. Polyacrylonitrile microspheres were determined to have agglomerated at the surface, which resulted in a marked difference between the surface and bottom portions. This comparison shows that silicone compositions prepared without an inorganic material powder using hollow particles of an organic resin as the only filler, have a poor storage stability.

Comparison Example 2

A silicone composition was prepared as in Example 2, except that 5 g of 16–32 μm diameter vinylidene chloride/ acrylonitrile hollow microspheres having no other powder supported on its surface, was used instead of hollow microspheres of polyacrylonitrile resin having calcium carbonate powder supported on their surface. This comparison silicone composition was stored in a glass vial for one week, after which time the appearance of the surface and bottom portions of the composition were visually inspected. The vinylidene chloride/acrylonitrile microspheres were found to have agglomerated at the surface, which resulted in a marked difference between the surface and bottom portions. This comparison shows that silicone compositions prepared using hollow particles with surfaces devoid of an inorganic material powder have a poor storage stability.

TABLE 1

|  | tan δ (25° C.) | tan δ (25° C.)/ tan δ (70° C.) | storage stability |
| --- | --- | --- | --- |
| Example 1 | 6 | 0.92 | good |
| Example 2 | 5 | 0.99 | good |
| Example 3 | 10 | 1.30 | good |
| Example 4 | 6 | 0.8 | good |
| Example 5 | 6 | 0.93 | good |
| Comp. Example 1 | 3 | 1.2 | poor |

Thus, it can be seen that vibration damping silicone compositions according to the invention and containing components (A) to (C), in particular those compositions using as fillers component (B) of hollow particles of organic resins having inorganic material powders supported on surfaces of the hollow particles, are capable of imparting excellent vibration damping, and have long term storage stability.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A vibration damping silicone composition comprising:
   (A) 100 parts by weight of a silicone oil,
   (B) 0.1–50 parts by weight of hollow particles of an organic resin having an inorganic material powder supported on surfaces of the hollow particles, and
   (C) 1–300 parts by weight of an inorganic material powder
   wherein component (B) has a larger mean particle size than component (C).

2. A vibration damping silicone composition according to claim 1 in which component (C) is treated with a fatty acid or a fatty acid derivative.

3. A vibration damping silicone composition according to claim 1 in which the mean particle size of component (B) is at least 10 μm greater than the mean particle size of component (C).

4. A vibration damping silicone composition comprising:
   (A) 100 parts by weight of a silicone oil,
   (B) 0.1–50 parts by weight of hollow particles of an organic resin having an inorganic material powder supported on surfaces of the hollow particles,
   (C) 1–300 parts by weight of an inorganic material powder, and
   (D) 0.1–20 parts by weight of a fatty acid or fatty acid derivative.

5. A vibration damping silicone composition according to claim 4 in which component (C) is pretreated with a fatty acid or a fatty acid derivative.

6. A vibration damping silicone composition according to claim 4 in which the mean particle size of component (B) is at least 10 μm greater than the mean particle size of component (C).

7. A vibration damping silicone composition comprising:
   (A) 100 parts by weight of a silicone oil,
   (B) 0.1–50 parts by weight of hollow particles of an organic resin having an inorganic material powder supported on surfaces of the hollow particles, and
   (C) 1–300 parts by weight of an inorganic material powder treated with a fatty acid or fatty acid derivative.

8. A vibration damping silicone composition according to claim 1 wherein the silicone oil is a trimethylsiloxy end capped dimethylpolysiloxane.

9. A vibration damping silicone composition according to claim 4 wherein the silicone oil is a trimethylsiloxy end capped dimethylpolysiloxane.

10. A vibration damping silicone composition according to claim 7 wherein the silicone oil is a trimethylsiloxy end capped dimethylpolysiloxane.

* * * * *